United States Patent
Xia et al.

(10) Patent No.: US 10,631,344 B2
(45) Date of Patent: Apr. 21, 2020

(54) METHOD AND APPARATUS FOR ACQUIRING RESOURCES

(71) Applicant: ZTE CORPORATION, Shenzhen, Guangdong Province (CN)

(72) Inventors: Shuqiang Xia, Shenzhen (CN); Bo Dai, Shenzhen (CN); Wei Gou, Shenzhen (CN); Focai Peng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 392 days.

(21) Appl. No.: 15/505,928

(22) PCT Filed: Nov. 28, 2014

(86) PCT No.: PCT/CN2014/092574
§ 371 (c)(1),
(2) Date: Jun. 28, 2017

(87) PCT Pub. No.: WO2015/117475
PCT Pub. Date: Aug. 13, 2015

(65) Prior Publication Data
US 2017/0311348 A1    Oct. 26, 2017

(30) Foreign Application Priority Data
Aug. 26, 2014   (CN) .......................... 2014 1 0428589

(51) Int. Cl.
*H04W 74/08* (2009.01)
*H04W 74/00* (2009.01)

(52) U.S. Cl.
CPC ....... *H04W 74/085* (2013.01); *H04W 74/006* (2013.01); *H04W 74/008* (2013.01); *H04W 74/0816* (2013.01)

(58) Field of Classification Search
None
See application file for complete search history.

(56) References Cited

U.S. PATENT DOCUMENTS

| 2012/0302274 A1* | 11/2012 | Ohta | H04W 72/042 |
| | | | 455/509 |
| 2013/0195081 A1* | 8/2013 | Merlin | H04W 74/002 |
| | | | 370/336 |

(Continued)

FOREIGN PATENT DOCUMENTS

| CN | 101715237 A | 5/2010 |
| CN | 102696247 A | 9/2012 |

(Continued)

*Primary Examiner* — Saba Tsegaye
(74) *Attorney, Agent, or Firm* — Knobbe Martens Olson & Bear LLP

(57) ABSTRACT

The present disclosure provides a method and an apparatus for acquiring a resource. Herein, the method includes the following steps: acquiring a resource request index and a contention opportunity set (100); acquiring a number of maximum contention times (101); determining a contention opportunity that UE participates in contention according to the acquired resource request index, the contention opportunity set and the number of the maximum contention times; and acquiring a resource for sending data by using the contention opportunity (102). By means of the present disclosure, since UE can participate in contention for the contention opportunity set only after acquiring information about the number of the maximum contention times, the problem of collision, i.e., contention conflict caused by a reason that a plurality of UEs contend for the same contention opportunity can be easily reduced.

13 Claims, 1 Drawing Sheet

(56) References Cited

U.S. PATENT DOCUMENTS

2013/0301541 A1* 11/2013 Mukherjee ........ H04W 74/0833
370/329
2014/0126471 A1* 5/2014 Sampath ............... H04W 24/08
370/328

FOREIGN PATENT DOCUMENTS

| CN | 103229582 A | 7/2013 |
| WO | WO2014021990 A1 | 2/2014 |

* cited by examiner

METHOD AND APPARATUS FOR ACQUIRING RESOURCES

TECHNICAL FIELD

The present disclosure relates to a resource acquisition technology, in particular to a method and an apparatus for acquiring a resource.

BACKGROUND

In a wireless communication system, when User Equipment UE or a machine terminal device (hereunder uniformly described as UE for simplicity) has data which need to be sent, firstly a resource for sending data needs to be acquired. In the related art, UE usually acquires a resource by adopting one of the following two ways.

One way for acquiring a resource is that UE firstly makes a request for a resource to a network, and the network sends a grant to the UE by adopting a scheduling manner; and the UE detects the grant and then acquires the resource allocated by the network to the UE according to the indication of the grant. This way has the disadvantage that much signaling overhead and processing delay are needed. Besides, when the resource allocated by the network is on an unlicensed carrier, the network usually needs to firstly contend for the resource by itself, and only after the contention succeeds, the network can allocate partial or all contended resources to the UE which applies for the resources. By taking processing time of an LTE system as an example, supposing that the network successfully contends for a resource of M subframes at a subframe n, and not considering scheduling delay, the network sends an uplink grant at a subframe (n+1), and the UE can use the uplink resource indicated by the uplink grant for sending data only at a subframe (n+5) at fastest and the data are completely transmitted at a subframe (n+6). In other words, the network successfully contends for the resource of at least six subframes, such that the last subframe thereof can be used for uplink sending. This way for acquiring a resource decreases the utilization efficiency of resources to a certain extent. Particularly, when there are many UEs which need to send data in the network, for example, in a Massive Machine Communication MMC scenario, each network possibly has tens of thousands of UEs, and at this moment the signaling overhead and processing delay would be more serious. Moreover, the problem of collision caused by a reason that a plurality of UEs contend for the same contention opportunity is brought, and the resource utilization efficiency is decreased more obviously.

The other way for acquiring a resource is that UE acquires the resource base on a mode of contending with other UE on one or some carriers. This way has already been widely applied in WLAN systems. However, when the number of UEs is comparatively great, for the reason of contention conflict, i.e., the problem of collision caused by a reason that a plurality of UEs contend for the same contention opportunity, the situation of rapid decrease of resource utilization efficiency will be also caused.

SUMMARY

To solve the above-mentioned technical problem, the present disclosure provides a method and an apparatus for acquiring a resource, which can reduce the contention conflict, decrease the signaling overhead and reduce the delay, and thereby improve the resource utilization rate.

To achieve the purpose of the present disclosure, the following technical solution is adopted.

A method for acquiring a resource includes:
acquiring a resource request index and a contention opportunity set;
acquiring a number of maximum contention times; and
determining a contention opportunity that UE participates in contention according to the acquired resource request index, the contention opportunity set and the number of the maximum contention times, and acquiring a resource for sending data by using the contention opportunity.

In an exemplary embodiment, the step of acquiring a resource request index and a contention opportunity set includes:
the UE receiving the contention opportunity set and the resource request index allocated by a network to the UE.

In an exemplary embodiment, the resource request index is a scheduling request channel index, a random access preamble index, a measurement pilot index or a terminal identifier.

In an exemplary embodiment, the resource request index corresponds to a resource for sending data in the UE.

The step of acquiring a number of maximum contention times includes: the UE sends resource request information to the network by using the resource request index; and the UE receives the number of the preconfigured maximum contention times from the network.

In an exemplary embodiment, the step of acquiring a number of maximum contention times includes: the UE receives the number of the maximum contention times directly allocated by the network to the UE.

In an exemplary embodiment, the resource request index is a scheduling request channel index or a measurement pilot index.

The step of acquiring a number of maximum contention times includes: the UE acquires the number of the maximum contention times according to a period of a scheduling request channel or a measurement pilot allocated by the network.

In an exemplary embodiment, the period of the scheduling request channel or the measurement pilot allocated by the network to the UE is T.

The step of acquiring the number of the maximum contention times according to a period of a scheduling request channel or a measurement pilot allocated by the network includes: obtaining the number of the maximum contention times according to a formula $T_{max}/T$. Herein, $T_{max}$ is a time constant appointed by the network and the UE.

In an exemplary embodiment, the time constant $T_{max}$ is a maximum period of the scheduling request channel or the measurement pilot.

In an exemplary embodiment, the method further includes: the network sends a contention offset constant to the UE.

In an exemplary embodiment, totally there are V contention opportunities in the contention opportunity set, and indexes of the V contention opportunities are respectively 0, 1, 2 . . . (V−1); the number of the maximum contention times is K and the resource request index is I.

The step of determining a contention opportunity that the UE participates in contention includes:
an index $R_k$ (k=0, 1 . . . (K−1)) of a contention opportunity that the UE participates in contention at a kth time is: $R_k$=I mod V. Herein, mod is a modulo operation.

In an exemplary embodiment, totally there are V contention opportunities in the contention opportunity set, and indexes of the V contention opportunities are respectively 0, 1, 2... (V−1); the number of the maximum contention times is K and the resource request index is I.

The step of determining a contention opportunity that the UE participates in contention includes:

an index $R_k$ (k=0, 1... (K−1)) of a contention opportunity that the UE participates in contention at a kth time is: $R_k=(I+C)$ mod V. Herein, C is the contention offset constant.

In an exemplary embodiment, the resource request index is I and I is an integer; totally there are V contention opportunities in the contention opportunity set, and indexes of the V contention opportunities are respectively 0, 1, 2... (V−1); the number of the maximum contention times is K.

The step of determining a contention opportunity that the UE participates in contention includes: the UE determines that an index $R_k$ of a contention opportunity at a kth (k=0, 1, 2... (K−1)) time is:

$$R_k = kM + X_k \bmod M; \text{ or } R_k = kM + \left\lfloor \frac{MX_k}{D} \right\rfloor;$$

Herein, $$M = \left\lfloor \frac{V}{K} \right\rfloor; X_{-l} = I; \text{ and } X_k = AX_{K-l} \bmod D.$$

Herein, D is a positive integer greater than V and satisfies $D=2^L$ or $D=2^L+1$. Herein, L is a positive integer, and if a minimum bit number used by a network side for allocating the resource request index is B, L is a number not smaller than B; and A is a number which is coprime with D.

In an exemplary embodiment, the resource request index is I and I is an integer; totally there are V contention opportunities in the contention opportunity set, and indexes of the V contention opportunities are respectively 0, 1, 2... (V−1); the number of the maximum contention times is K and the contention offset constant is C.

The step of determining a contention opportunity that the UE participates in contention includes: the UE determines that an index $R_k$ of a contention opportunity at a kth (k=0, 1, 2... (K−1)) time is: $R_k=kM+X_k$ mod M; or $$R_k = kM + \left\lfloor \frac{MX_k}{D} \right\rfloor.$$

Herein, $$M = \left\lfloor \frac{V}{K} \right\rfloor; X_{-l} = I; \text{ and } X_k = (AX_{K-l} + C) \bmod D.$$

Herein, D is a positive integer greater than V and satisfies $D=2^L$ or $D=2^L+1$. Herein, L is a positive integer, and if a minimum bit number used by a network side for allocating the resource request index is B, L is a number not smaller than B; and A is a number which is coprime with D.

In an exemplary embodiment, the A is the number which is coprime with D and satisfies $$0.6 \leq \frac{A}{D} \leq 0.7.$$

In an exemplary embodiment, the A is the number which is coprime with D and is closest to a golden ratio. Herein, the golden ratio is $$\frac{-1+\sqrt{5}}{2}.$$

In an exemplary embodiment, the method further includes the following steps.

The UE acquires one or more maximum contention time values allocated by the network to the UE.

When the UE receives one of the specific maximum contention time values, the UE quits participating in contention for one or more appointed contention opportunities according to the specific maximum contention time value.

In an exemplary embodiment, the method further includes the following steps.

The UE acquires one or more contention offset constants allocated by the network to the UE.

When the UE receives one of the specific contention offset constants, the UE quits participating in contention for one or more appointed contention opportunities according to the specific contention offset constant.

An apparatus for acquiring a resource for sending data includes an acquisition module and a determination module.

The acquisition module is arranged to acquire a resource request index, a contention opportunity set and a number of maximum contention times.

The determination module is arranged to determine a contention opportunity that UE participates in contention according to the acquired resource request index, the contention opportunity set and the number of maximum contention times, and acquire a resource for sending data by using the contention opportunity.

In an exemplary embodiment, the acquisition module is arranged to acquire a resource request index, a contention opportunity set and a number of maximum contention times according to the following mode.

It is to receive the resource request index and the contention opportunity set allocated by a network to the UE, and to receive the number of the maximum contention times allocated by the network to the UE.

Or, it is to receive the resource request index and the contention opportunity set allocated by the network to the UE. When the resource request index allocated by the network to the UE is a scheduling request channel index or a measurement pilot index, it is to acquire the number of the maximum contention times according to a period of the scheduling request channel or the measurement pilot allocated by the network.

In an exemplary embodiment, the acquisition module is further arranged to receive a contention offset constant configured by the network to the UE.

The determination module is further arranged to determine the contention opportunity that the UE participates in contention according to the contention offset constant.

In an exemplary embodiment, the acquisition module is further arranged to acquire one or more specific maximum contention time values and/or specific contention offset constants allocated by the network to the UE.

The determination module is further arranged to, when one of the specific maximum contention time values and/or specific contention offset constants is received, quit participating in contention for one or more appointed contention opportunities according to the specific maximum contention time value and/or specific contention offset constant.

A computer program including program instructions is provided. When the program instructions are executed by a computer, the computer can implement the method for acquiring a resource.

A carrier carrying the computer program is provided.

In the technical solution of the present disclosure, when the resource request index is the scheduling request channel index or the measurement pilot index, the number of the maximum contention times of the UE may be determined according to the period of the scheduling request channel or the measurement pilot. Therefore, the overhead and delay caused by a reason that the network sends the number of the maximum contention times and the like are reduced. In addition, the network configures different scheduling request channel indexes or measurement pilot indexes and periods for different UEs, and thereby the probability of collision caused by a reason that a plurality of UEs contend for the same contention opportunity is decreased.

Other features and advantages of the present disclosure will be described subsequently in the description, and partially become obvious from the description or can be understood by implementing the present disclosure. The purpose and other advantages of the present disclosure may be realized and acquired through structures which are especially pointed-out in the description, claims and drawings.

BRIEF DESCRIPTION OF DRAWINGS

The drawings described here are used for providing further understanding about the present disclosure and constitute a part of the present application. The exemplary embodiments of the present disclosure and the description thereof are used for explaining the present disclosure instead of improperly limiting the present disclosure. In the drawings.

DETAILED DESCRIPTION

The embodiments of the present disclosure will be described below in detail with reference to the drawings. It needs to be stated that the embodiments in the present application and the features in the embodiments may be mutually and freely combined under the situation of no conflict.

Figure 1:
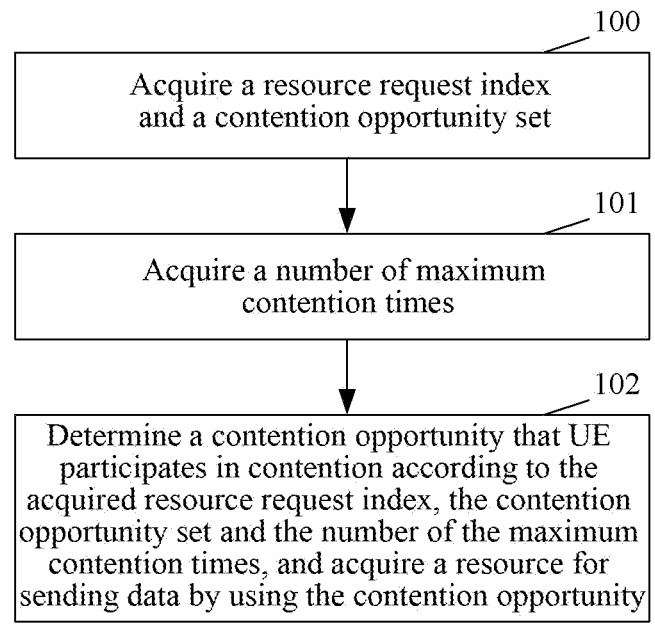
FIG. 1 illustrates a flowchart of a method for acquiring a resource provided by an embodiment of the present disclosure.

FIG. 1 illustrates a flowchart of a method for acquiring a resource provided by the embodiment of the present disclosure. As illustrated in FIG. 1, the method includes the following steps 100-102.

In step 100, a resource request index and a contention opportunity set are acquired.

In the step, the resource request index and the contention opportunity set are allocated by a network such as a base station to UE.

Herein, one resource request index corresponds to a resource which can be used by one UE for sending data. Herein, a corresponding mode may be "implicit corresponding". For example, there are N resources which are respectively resource 0, resource 1 . . . resource N−1; and the network allocates a resource index x to the UE and the UE may use a resource x for sending data.

The contention opportunity set includes one or more contention opportunities. A contention opportunity refers to a time-frequency resource that a terminal may particulate in contention. If the contention succeeds, the UE may use the time-frequency resource or a part of the time-frequency resource for sending data.

The resource request index may be an index of a scheduling request channel allocated by the network to the UE, or a random access preamble index, or a measurement pilot index, or a terminal identifier such as a Radio Network Temporary Identity RNTI, or the like.

In step 101, the number of maximum contention times is acquired.

The number of the contention opportunities in the contention opportunity set is not smaller than the number of the maximum contention times.

In an exemplary embodiment, the number of the contention opportunities is integral multiples of the number of the maximum contention times.

In the step, modes of acquiring the number of the maximum contention times may include the following modes 1) and 2).

1) When the resource request index corresponds to a resource which can be used by the UE for sending data, e.g., corresponds to a scheduling request channel resource, a measurement pilot resource, a random access preamble resource or the like, the UE determines the resource which can be used for sending according to the resource request index allocated by the network and further sends a resource request to the network by using the resource. After the network receives the resource request from the UE, the network sends the number of the maximum contention times to the UE.

Herein, the number of maximum contention times are N. For the contention opportunity set acquired in the step 100, regardless of whether data are completely sent, the UE at most participates in contention for the N contention opportunities.

In an exemplary embodiment, the network may also allocate one or more specific maximum contention time values to the UE. When the UE receives one of these specific maximum contention time values, the UE quits participating in contention for one or more appointed contention opportunities. For example, supposing that values of the number of the maximum contention times are 10, 11, 50, 51, 100, 101, 200 and 201, the network and the UE may appoint that, when the number of the maximum contention times N received by the UE is one of {10, 50, 100, 200}, it indicates that the number of the maximum contention times is N; and when the number of the maximum contention times N received by the UE is one of {11, 51, 101, 201}, the UE quits participating in contention for one or more appointed contention opportunities. For example, when N=11, the UE quits participating in contention for one appointed contention opportunity; when N=51, the UE quits participating in contention for two appointed contention opportunities; when N=101, the UE quits participating in contention for 100 appointed contention opportunities; and when N=201, the UE quits participating in contention for all appointed contention opportunities. In the above-mentioned example, 11, 51, 101 and 201 are specific maximum contention time values.

In an exemplary embodiment, the network may also allocate one contention offset constant to the UE, and the contention offset constant further decreases the probability of collision caused by a reason that a plurality of UEs contend for the same contention opportunity. It needs to be stated that the network may also further allocate one or more specific contention offset constants to the UE. When the UE receives one of these specific contention offset constants, the UE quits participating in contention for one or more appointed contention opportunities. The application of the specific contention offset constants is consistent with the application of the above-mentioned specific maximum contention time values. The application of the specific contention offset constants can be easily understood by one skilled in the art according to the description about the specific maximum contention time values in the previous paragraph, and thus is not repetitively described here. Herein, the contention offset constant may be set according to actual application scenarios, as long as it can reduce the probability of collision caused by the reason that a plurality of UEs contend for the same contention opportunity. Specific setting can be easily realized by one skilled in the art and thus is not repetitively described here. It needs to be emphasized that, in the method provided by the embodiment of the present disclosure, the probability of collusion caused by the reason that a plurality of UEs contend for the same contention opportunity is further reduced through the contention offset constant allocated by the network to the UE.

In other words, when the number of the maximum contention times and/or the contention offset constant received by the UE is a specific value appointed by the UE and the network, the UE quits participating in contention for one or more appointed contention opportunities according to the specific value.

The above-mentioned number of the maximum contention times or contention offset constant may be a value appointed by the network and the UE and is directly allocated by the network to the UE.

2) When the resource request index allocated by the network in the step 100 is a scheduling request channel index or a measurement pilot index and the network does not allocates the number of the maximum contention times to the UE or does not appoint with the UE about the number of the maximum contention times, in this step, another mode for acquiring the number of the maximum contention times is that the UE acquires the number of the maximum contention times according to a period of a scheduling request channel or a measurement pilot allocated by the network. The mode specifically includes that the following operations.

Supposing that the period of the scheduling request channel or the measurement pilot allocated by the network to the UE is T, the number of the maximum contention times in one contention period is $T_{max}/T$. Herein, $T_{max}$ is a time constant appointed by the network and the UE.

In an exemplary embodiment, the time constant $T_{max}$ is the maximum period of the scheduling request channel or the measurement pilot. Thereby, the overhead and delay caused by a reason that the network sends the number of the maximum contention times are reduced. In an exemplary embodiment, the network may also configure different scheduling request channel indexes and periods for different UEs to reduce the probability of collision caused by the reason that a plurality of UEs contend for the same contention opportunity.

In step 102, a contention opportunity that UE participates in contention is determined according to the acquired resource request index, the contention opportunity set and the number of the maximum contention times, and a resource for sending data is acquired by using the contention opportunity.

In the step, the step of determining the contention opportunity that the UE participate in contention includes the following operation.

The UE determines the contention opportunity that the UE participates in contention according to the resource request index. There are many specific implementation manners. Description here is made only by illustrating examples and is not used for limiting the protection scope of the present disclosure. For example, it is supposed that totally there are V contention opportunities in the contention opportunity set, and indexes of these contention opportunities are respectively 0, 1, 2. . . (V−1); the number of the maximum contention times is K and the resource request index obtained by the UE and allocated by the network is I. Simply, an index $R_k$ (k=0, 1. . . (K−1)) of a contention opportunity that the UE participates in contention at a kth time is: $R_k$=I mod V, herein mod denotes the modulo operation.

If the network and the UE further appoint a contention offset constant, simply, the index of the contention opportunity that the UE participates in contention at the kth time is: $R_k$=(I+C) mod V, herein C is the contention offset constant.

In the step 102, another mode may also be adopted for determining the contention opportunity that the UE participates in contention as follows.

It is supposed that the resource request index obtained by the UE and allocated by the network is I (I is an integer), totally there are V contention opportunities in the contention opportunity set and indexes of these contention opportunities are respectively 0, 1, 2. . . (V−1). At this moment, the resource request index may be an index of a scheduling request channel, a random access preamble index, a measurement pilot index, a terminal identifier such as a Radio Network Temporary Identity RNTI or the like, which are allocated by the network to the UE. Here, supposing that the number of the maximum contention times is K and the contention offset constant is C, then the mode that the UE determines an index of a contention opportunity at a kth (k=0, 1, 2. . . (K−1)) time is as shown by a formula (1) or (2):

$$R_k = kM + X_k \bmod M \qquad (1)$$

or, $$R_k = kM + \left\lfloor \frac{MX_k}{D} \right\rfloor \qquad (2)$$

In the formula (1) or (2), $$M = \left\lfloor \frac{V}{K} \right\rfloor$$

and the operator $\lfloor \; \rfloor$ denotes a flooring operation; $X_{-1}$=I and $X_k$=(A$X_{k-1}$+C) mod D; and when there is no contention offset constant, C=0; D is a positive integer greater than V and satisfies D=$2^L$ or D=$2^L$+1. Herein, L is a positive integer. If a minimum bit number used by a network side for allocating the resource request index is B, L is a number not smaller than B; and A is a number which is coprime with D.

Better, A is a positive integer which is coprime with D and satisfies $$0.6 \le \frac{A}{D} \le 0.7.$$

Further better, A is a positive integer which is coprime with D and is closest to a golden ratio $$\frac{-1+\sqrt{5}}{2}.$$

By adopting the method provided by the embodiment of the present disclosure, the UE can participate in contention for the contention opportunity set only after acquiring information about the number of the maximum contention times. Therefore, based on the method provided by the embodiment of the present disclosure, the problem of collision, i.e., contention conflict, caused by a reason that a plurality of UEs contend for the same contention opportunity can be easily reduced by only adjusting a moment of sending the number of the maximum contention times or a setting mode of the number of the maximum contention times for different UEs. At the same time, signaling overhead and processing delay caused by a reason that a network side schedules resources for UEs are avoided, and thereby the resource utilization rate is improved.

Figure 2:
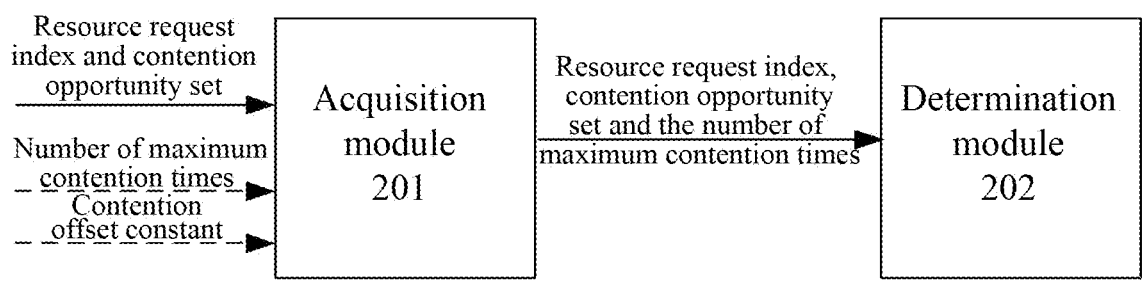
FIG. 2 illustrates a structural schematic diagram of components of an apparatus for acquiring a resource provided by an embodiment of the present disclosure.

FIG. 2 illustrates a structural schematic diagram of components of an apparatus for acquiring a resource provided by the embodiment of the present disclosure. As illustrated in FIG. 2, the apparatus for acquiring a resource at least includes an acquisition module 201 and a determination module 202.

The acquisition module 201 is arranged to acquire a resource request index, a contention opportunity set, and acquire a number of maximum contention times for using the contention opportunity set.

The determination module 202 is arranged to determine a contention opportunity that UE participates in contention according to the acquired resource request index, the contention opportunity set and the number of the maximum contention times, and acquire a resource for sending data by using the contention opportunity.

Herein, the acquisition module 201 is specifically arranged to:

receive the resource request index and the contention opportunity set allocated by a network side to the UE; and receive the number of the maximum contention times allocated by the network side to the UE; or receive the resource request index and the contention opportunity set allocated by the network side to the UE; and when the resource request index configured by the network side is a scheduling request channel index or a measurement pilot index, acquire the number of the maximum contention times according to a period of the scheduling request channel or the measurement pilot allocated by the network.

In an exemplary embodiment, the acquisition module 201 is further arranged to receive a contention offset constant configured by the network side to the UE. At this moment, the determination module is further arranged to determine the contention opportunity that the UE participate in contention according to the contention offset constant.

In an exemplary embodiment, the acquisition module 201 is further arranged to acquire one or more specific maximum contention time values and/or specific contention offset constants allocated by the network to the UE.

Corresponding, the determination module 202 is further arranged to, when one of the specific maximum contention time values and/or specific contention offset constants is received, quit participating in contention for one or more appointed contention opportunities according to the specific maximum contention time value and/or specific contention offset constant.

In an exemplary embodiment, the resource request index is a scheduling request channel index, a random access preamble index, a measurement pilot index or a terminal identifier.

In an exemplary embodiment, the resource request index corresponds to a resource for sending data in the UE.

The acquisition module 201 is arranged to acquire a number of maximum contention times according to the following mode: sending resource request information to the network by using the resource request index; and receiving the number of the preconfigured maximum contention times from the network.

In an exemplary embodiment, the acquisition module 201 is arranged to acquire the number of the maximum contention times according to the following mode: receiving the number of the maximum contention times directly allocated by the network to the UE.

In an exemplary embodiment, the resource request index is a scheduling request channel index or a measurement pilot index.

The acquisition module 201 is arranged to acquire the number of the maximum contention times according to the following mode: acquiring the number of the maximum contention times according to a period of the scheduling request channel or the measurement pilot allocated by the network.

In an exemplary embodiment, the period of the scheduling request channel or the measurement pilot allocated by the network to the UE is T.

The acquisition module 201 is arranged to acquire the number of the maximum contention times according to the period of the scheduling request channel or the measurement pilot allocated by the network according to the following mode: obtaining the number of the maximum contention times according to a formula $T_{max}/T$. Herein, $T_{max}$ is a time constant appointed by the network and the UE.

In an exemplary embodiment, the time constant $T_{max}$ is the maximum period of the scheduling request channel or the measurement pilot.

In an exemplary embodiment, totally there are V contention opportunities in the contention opportunity set, and indexes of the V contention opportunities are respectively 0, 1, 2 ... (V−1); the number of the maximum contention times is K and the resource request index is I.

The determination module 202 is arranged to determine the contention opportunities that the UE participates in contention according to the following mode.

It is determined that an index $R_k$ (k=0, 1 ... (K−1)) of a contention opportunity that the UE participates in contention at a kth time is: $R_k$=I mod V. Herein, mod is the modulo operation.

The acquisition module 201 is further arranged to receive a contention offset constant sent by the network.

Under a situation that the contention offset constant sent by the network is received, totally there are V contention opportunities in the contention opportunity set, and indexes of the V contention opportunities are respectively 0, 1, 2 . . . (V−1); the number of the maximum contention times is K and the resource request index is I.

The determination module 202 is arranged to determine the contention opportunities that the UE participates in contention according to the following mode.

It is determined that an index $R_k$ (k=0, 1 . . . (K−1)) of a contention opportunity that the UE participates in contention at a kth time is: $R_k$=(I+C) mod V. Herein, C is the contention offset constant.

The resource request index is I and I is an integer; totally there are V contention opportunities in the contention opportunity set, and indexes of the V contention opportunities are respectively 0, 1, 2 . . . (V−1); the number of the maximum contention times is K.

The determination module 202 is arranged to determine the contention opportunities that the UE participates in contention according to the following mode: it is determined that an index $R_k$ of a contention opportunity of the UE at a kth (k=0, 1, 2 . . . (K−1)) time is: $R_k$=kM+$X_k$ mod M; or $$R_k = kM + \left\lfloor \frac{MX_k}{D} \right\rfloor$$

Herein, $$M = \left\lfloor \frac{V}{K} \right\rfloor; X_{-1} = I; \text{ and } X_k = AX_{k-1} \bmod D.$$

Herein, D is a positive integer greater than V and satisfies D=$2^L$ or D=$2^L$+1; and L is a positive integer. If a minimum bit number used by a network side for allocating the resource request index is B, L is a number not smaller than B; and A is a number which is coprime with D.

In an exemplary embodiment, the A is a number which is coprime with D and satisfies $$0.6 \leq \frac{A}{D} \leq 0.7.$$

In an exemplary embodiment, the A is a number which is coprime with D and is closest to a golden ratio. Herein, the golden ratio is $$\frac{-1+\sqrt{5}}{2}.$$

The acquisition module 201 is further arranged to receive a contention offset constant sent by the network.

Under a situation that the contention offset constant sent by the network is received, the resource request index is I and I is an integer; totally there are V contention opportunities in the contention opportunity set, and indexes of the V contention opportunities are respectively 0, 1, 2 . . . (V−1); the number of the maximum contention times is K and the contention offset constant is C.

The determination module 202 is arranged to determine the contention opportunities that the UE participates in contention according to the following mode: it is determined that an index $R_k$ of a contention opportunity of the UE at a kth (k=0, 1, 2 . . . (K−1)) time is: $R_k$=kM+$X_k$ mod M; or $$R_k = kM + \left\lfloor \frac{MX_k}{D} \right\rfloor.$$

Herein, $$M = \left\lfloor \frac{V}{K} \right\rfloor; X_{-1} = I; \text{ and } X_k = (AX_{k-1}+C) \bmod D.$$

Herein, D is a positive integer greater than V and satisfies D=$2^L$ or D=$2^L$+1; L is a positive integer, If a minimum bit number used by a network side for allocating the resource request index is B, L is a number not smaller than B; and A is a number which is coprime with D.

In an exemplary embodiment, the A is a number which is coprime with D and satisfies $$0.6 \leq \frac{A}{D} \leq 0.7.$$

In an exemplary embodiment, the A is a number which is coprime with D and is closest to a golden ratio. Herein, the golden ratio is $$\frac{-1+\sqrt{5}}{2}.$$

The acquisition module 201 is further arranged to acquire one or more maximum contention time values allocated by the network to the UE.

The determination module 202 is further arranged to, when the acquisition module 201 receives one of the specific maximum contention time values, quit participating in contention for one or more appointed contention opportunities according to the specific maximum contention time value.

The acquisition module 201 is further arranged to acquire one or more contention offset constants allocated by the network to the UE.

The determination module 202 is further arranged to, when the acquisition module 201 receives one of the specific contention offset constants, quit participating in contention for one or more appointed contention opportunities according to the specific contention offset constant.

The apparatus for acquiring a resource provided by the embodiment of the present disclosure may be arranged in UE or may be a terminal device independent of UE.

The embodiment of the present disclosure further discloses a computer program, including program instructions. When the program instructions are executed by a computer, the computer can implement the method for acquiring a resource.

The embodiment of the present disclosure further discloses a carrier carrying the computer program.

The method provided by the embodiment of the present disclosure will be described below in detail in combination with the specific embodiments.

It is supposed that a contention opportunity set includes 7 contention opportunities. A contention opportunity is defined as a time-frequency resource for which a terminal may participate in contention. If the contention succeeds, the time-frequency resource or a part of the time-frequency resource may be used for sending data.

Each contention opportunity corresponds to an index of a contention opportunity. In time domain, a contention opportunity corresponds to a period of determined time; and in frequency domain, a contention opportunity corresponds to all or determined partial frequency-domain resources on a carrier. The magnitude of each contention opportunity in a contention opportunity set may be the same and may also be different. Various contention opportunities in time or frequency may also be continuous or discontinuous.

In embodiment one, firstly a network allocates a contention opportunity set and a resource request index to UE. Here, the resource request index further corresponds to a resource which can be used by the UE for sending data, e.g., corresponds to a scheduling request channel resource, or a measurement pilot resource, or a random access preamble resource, or the like.

Secondly, the UE sends resource request information to the network by using the resource request index allocated by the network. Here, the UE determines the resource which can be used for sending data according to the resource request index allocated by the network, and further sends resource request information to the network by using the resource.

The network sends information about a number of maximum contention times to the UE. In embodiment one, it is supposed that the number of the maximum contention times is N, and for the contention opportunity set allocated by the network, regardless of whether data are completely sent, the UE at most participates in contention for N contention opportunities.

In an exemplary embodiment, the network may also allocate one or more specific maximum contention time values to the UE. When the UE receives one of these specific maximum contention time values, the UE quits participating in contention for one or more appointed contention opportunities according to the specific maximum contention time value.

In an exemplary embodiment, in addition to the number of maximum contention times sent by the network to the UE, the network may also send a contention offset constant, and the contention offset constant can further decrease the probability of collision caused by a reason that a plurality of UEs contend for the same contention opportunity.

Finally, the UE determines the contention opportunity that the UE participates in contention according to the resource request index. There are many specific implementation manners. Description here is made only by illustrating examples and is not used for limiting the protection scope of the present disclosure. For example, it is supposed that totally there are V contention opportunities in the contention opportunity set, and indexes of these contention opportunities are respectively 0, 1, 2 . . . (V−1); the number of maximum contention times is K and the resource request index obtained by the UE and allocated by the network is I. Then, an index $R_k$ (k=0, 1 . . . (K−1)) of a contention opportunity that the UE participates in contention at a kth time is: $R_k$=I mod V or $R_k$=(I+C) mod V. Herein, C is the contention offset constant.

When the method provided by embodiment one is used, the UE can participate in contention for the contention opportunity set only after receiving information about the number of the maximum contention times allocated by the network side. Therefore, the network side may adopt multiple modes, such as adjusting a moment of sending the number of the maximum contention times (e.g., immediately sending after the resource request information sent by the UE is received, or sending in a delay of a certain time period after the resource request information sent by the UE is received, or the like) or a setting mode of the number of the maximum contention times for different UEs, and sending specific maximum contention time values or allocating different contention offset constants for different UEs, etc., consequently the problem of collision caused by a reason that a plurality of UEs contend for the same contention opportunity can be reduced. At the same time, in the method provided by the embodiment of the present disclosure since the resource is acquired through contention performed by the UE and a network side such as eNB does not need to send scheduling signaling, signaling overhead and processing delay caused by a reason that the network schedules resources for UE are avoided, thereby the resource utilization rate is improved and the additional delay caused by network resource contention is also avoided.

In embodiment two, firstly a network allocates a contention opportunity set and a resource request index to UE. Herein, the resource request index corresponds to a scheduling request channel index.

Secondly, the UE determines a number of maximum contention times. In embodiment two, it is supposed that the UE determines the number of the maximum contention times according to a period T of a scheduling request channel allocated by the network, then the number of the maximum contention times in one contention period is $T_{max}/T$. Herein, $T_{max}$ is a maximum period of the scheduling request channel.

Finally, the UE determines a contention opportunity that the UE participates in contention. Specifically, the UE determines the contention opportunity that the UE participates in contention according to the resource request index. There are many specific implementation manners. Description here is made only by illustrating examples and is not used for limiting the protection scope of the present disclosure. For example, it is supposed that totally there are V contention opportunities in the contention opportunity set, and indexes of these contention opportunities are respectively 0, 1, 2 . . . (V−1); the number of the maximum contention times is K and the resource request index obtained by the UE and allocated by the network is I. Then, an index $R_k$ (k=0, 1 . . . (K−1)) of a contention opportunity that the UE participates in contention at a kth time is: $R_k$=I mod V.

If the network and the UE further appoint a contention offset constant, an index of a contention opportunity that the UE participates in contention at a kth time is: $R_k$=(I+C) mod V. Herein, C is the contention offset constant.

As compared with embodiment one, in the embodiment two, the number of the maximum contention times of the UE may be determined according to the period of the scheduling request channel, and thereby the overhead and delay caused by a reason that the network sends the number of the maximum contention times and the like are reduced. In addition, the network side configures different scheduling request channel indexes and periods for different UEs, and thereby the probability of collision caused by a reason that a plurality of UEs contend for the same contention opportunity is decreased.

In embodiment three, firstly a network allocates a contention opportunity set and a resource request index to UE. Herein, the resource request index corresponds to a terminal identifier.

Secondly, the UE determines a number of maximum contention times. In embodiment three, it is supposed that the UE determines the number of the maximum contention times according to information about the number of the preconfigured maximum contention times sent by the network to the UE.

Finally, the UE determines the contention opportunity that the UE participates in contention. Specifically, the UE determines the contention opportunity that the UE participates in contention according to the resource request index. There are many specific implementation manners. Description here is made only by illustrating examples and is not used for limiting the protection scope of the present disclosure. For example, it is supposed that totally there are V contention opportunities in the contention opportunity set, and indexes of these contention opportunities are respectively 0, 1, 2. . . (V−1); the number of the maximum contention times is K and the resource request index obtained by the UE and allocated by the network side is I. Then, an index $R_k$ (k=0, 1. . . (K−1)) of a contention opportunity that the UE participates in contention at a kth time is: $R_k$=I mod V.

If the network and the UE further appoint a contention offset constant, an index of a contention opportunity that the UE participates in contention at a kth time is: $R_k$=(I+C) mod V. Herein, C is the contention offset constant.

In addition, based on the method provided by the embodiment of the present disclosure, the network may also periodically or non-periodically send information about the number of the maximum contention times, or the number of the maximum contention times and the contention offset constant to the UE. Correspondingly, the UE continuously or periodically receives the information sent by the network side and determines the contention opportunity that the UE participate in contention according to the received latest information about the number of the maximum contention times, or the number of the maximum contention times and the contention offset constant.

At this moment, the network may also dynamically update the information about the number of the maximum contention times, or the number of the maximum contention times and the contention offset constant according to the situation of service load of the UE in the network. Thereby, the probability of collision caused by a reason that a plurality of UEs contend for the same contention opportunity is decreased and simultaneously the resource utilization efficiency is further improved.

The above-mentioned embodiments are just alternative embodiments of the present disclosure and are not used for limiting the protection scope of the present disclosure. Any modifications, equivalent replacements, improvements and the like made within the essence and rule of the present disclosure should be all included in the protection scope of the present disclosure.

INDUSTRIAL APPLICABILITY

The method and the apparatus for acquiring a resource provided by the embodiments of the present disclosure can reduce the contention conflict, decrease the signaling overhead and reduce the delay, and thereby improve the resource utilization rate. Therefore, the present disclosure has very strong industrial applicability.

What we claim is:

1. A method for acquiring a resource, comprising:
acquiring a resource request index and a contention opportunity set;
acquiring a number of maximum contention times; and
determining a contention opportunity that UE participates in contention according to the acquired resource request index, the contention opportunity set and the number of the maximum contention times, and acquiring a resource for sending data by using the contention opportunity;
wherein the step of acquiring a resource request index and a contention opportunity set comprises:
the UE receiving the contention opportunity set and the resource request index allocated by a network to the UE; and
wherein the resource request index corresponds to a resource for sending data in the UE; and
the step of acquiring a number of maximum contention times comprises: the UE sending resource request information to the network by using the resource request index; and the UE receiving the number of the preconfigured maximum contention times from the network.

2. The method for acquiring a resource according to claim 1, wherein the method further comprises: the network sending a contention offset constant to the UE.

3. The method for acquiring a resource according to claim 2, wherein totally there are V contention opportunities in the contention opportunity set, and indexes of the V contention opportunities are respectively 0, 1, 2. . . (V−1), ); the number of the maximum contention times is K and the resource request index is I; and
the step of determining a contention opportunity that the UE participates in contention comprises:
an index $R_k$ (k=0, 1. . . (K−1)) of a contention opportunity that the UE participates in contention at a kth time is: $R_k$=(I+C) mod V; wherein C is the contention offset constant.

4. The method for acquiring a resource according to claim 2, wherein the resource request index is I and I is an integer; totally there are V contention opportunities in the contention opportunity set, and indexes of the V contention opportunities are respectively 0, 1, 2. . . (V−1); the number of the maximum contention times is K and the contention offset constant is C; and
the step of determining a contention opportunity that the UE participates in contention comprises: the UE determining that an index $R_k$ of a contention opportunity at a kth (k=0, 1, 2. . . (K−1)) time is: $R_k$=kM+$X_k$ mod M; or $$R_k = kM + \left\lfloor \frac{MX_k}{D} \right\rfloor;$$

wherein $$M = \left\lfloor \frac{V}{K} \right\rfloor; X_{-1} = I; \text{ and } X_k = (AX_{K-1} + C) \bmod D;$$

and
wherein D is a positive integer greater than V and satisfies D=$2^L$ or D=$2^L$+1; L is a positive integer; and if a minimum bit number used by a network side for allocating the resource request index is B, L is a number not smaller than B; and A is a number which is coprime with D.

5. The method for acquiring a resource according to claim 1, wherein:
totally there are V contention opportunities in the contention opportunity set, and indexes of the V contention opportunities are respectively 0, 1, 2. . . (V−1); the number of the maximum contention times is K and the resource request index is I; and the step of determining a contention opportunity that the UE participates in contention comprises:

an index $R_k(k=0, 1 \ldots (K-1))$ of a contention opportunity that the UE participates in contention at a kth time is: $R_k = I \bmod V$; wherein mod is a modulo operation.

6. The method for acquiring a resource according to claim 1, wherein the resource request index is I and I is an integer; totally there are V contention opportunities in the contention opportunity set, and indexes of the V contention opportunities are respectively 0, 1, 2. . . (V−1); the number of the maximum contention times is K; and the step of determining a contention opportunity that the UE participates in contention comprises: the UE determining that an index $R_k$ of a contention opportunity at a kth (k=0, 1, 2. . . (K−1)) time is: $R_k = kM + X_k \bmod M$; or $$R_k = kM + \left\lfloor \frac{MX_k}{D} \right\rfloor;$$

wherein $$M = \left\lfloor \frac{V}{K} \right\rfloor; X_{-1} = I; \text{ and } X_k = AX_{K-1} \bmod D;$$

and wherein D is a positive integer greater than V and satisfies $D=2^L$ or $D=2^L+1$; L is a positive integer; and if a minimum bit number used by a network side for allocating the resource request index is B, L is a number not smaller than B; and A is a number which is coprime with D.

7. The method for acquiring a resource according to claim 6, wherein the A is the number which is coprime with D and satisfies $$0.6 \leq \frac{A}{D} \leq 0.7.$$

8. The method for acquiring a resource according to claim 7, wherein the A is the number which is coprime with D and is closest to a golden ratio, wherein the golden ratio is $$\frac{-1+\sqrt{5}}{2}.$$

9. The method for acquiring a resource according to claim 1, wherein the resource request index is a scheduling request channel index, a random access preamble index, or a measurement pilot index.

10. A method for acquiring a resource, comprising:
acquiring a resource request index and a contention opportunity set;
acquiring a number of maximum contention times; and
determining a contention opportunity that UE participates in contention according to the acquired resource request index, the contention opportunity set and the number of the maximum contention times, and acquiring a resource for sending data by using the contention opportunity;

wherein the step of acquiring a resource request index and a contention opportunity set comprises:

the UE receiving the contention opportunity set and the resource request index allocated by a network to the UE; and wherein the resource request index is a scheduling request channel index or a measurement pilot index; and the step of acquiring a number of maximum contention times comprises: the UE acquiring the number of the maximum contention times according to a period of a scheduling request channel or a measurement pilot allocated by the network.

11. The method for acquiring a resource according to claim 10, wherein:
the period of the scheduling request channel or the measurement pilot allocated by the network to the UE is T; and
the step of acquiring the number of the maximum contention times according to the a period of a scheduling request channel or a measurement pilot allocated by the network comprises: obtaining the number of the maximum contention times according to a formula $T_{max}/T$, wherein $T_{max}$ is a time constant appointed by the network and the UE.

12. The method for acquiring a resource according to claim 11, wherein the time constant $T_{max}$ is a maximum period of the scheduling request channel or the measurement pilot.

13. A non-transitory carrier for storing computer programs including program instructions, wherein when the program instructions are executed by a computer, the computer is configured to implement the following steps:
acquiring a resource request index, a contention opportunity set, and a number of maximum contention times; and
determining a contention opportunity that UE participates in contention according to the acquired resource request index, the contention opportunity set and the number of the maximum contention times, and acquiring a resource for sending data by using the contention opportunity;
wherein the computer is configured in the UE, and the computer is further configured to implement the following steps:
receiving the contention opportunity set and the resource request index allocated by a network to the UE; and under the condition that the resource request index corresponds to a resource for sending data in the UE, sending resource request information to the network by using the resource request index, and receiving the number of the preconfigured maximum contention times from the network; or under the condition that the resource request index is a scheduling request channel index or a measurement pilot index, acquiring the number of the maximum contention times according to a period of a scheduling request channel or a measurement pilot allocated by the network.

* * * * *

UNITED STATES PATENT AND TRADEMARK OFFICE
CERTIFICATE OF CORRECTION

PATENT NO. : 10,631,344 B2
APPLICATION NO. : 15/505928
DATED : April 21, 2020
INVENTOR(S) : Shuqiang Xia Page 1 of 1

It is certified that error appears in the above-identified patent and that said Letters Patent is hereby corrected as shown below:

In the Claims

In Column 16, Line 24, Claim 3, delete "(V-1),);" and insert --(V-1);--.

In Column 18, Line 24, Claim 11, delete "the a" and insert --the--.

Signed and Sealed this
Twenty-seventh Day of August, 2024

Katherine Kelly Vidal
*Director of the United States Patent and Trademark Office*